US006726161B2

(12) United States Patent
Plump et al.

(10) Patent No.: US 6,726,161 B2

(45) Date of Patent: Apr. 27, 2004

(54) SHOWER ARM SUPPORT

(76) Inventors: Randal A. Plump, 7700 Upper Mount Vernon Rd., Evansville, IN (US) 47712; Ray A. Tenhumberg, 1629 Stinson Ave., Evansville, IN (US) 47712

(*) Notice: Subject to any disclaimer, the term of this patent is extended or adjusted under 35 U.S.C. 154(b) by 0 days.

(21) Appl. No.: 10/012,108

(22) Filed: Dec. 11, 2001

(65) Prior Publication Data

US 2003/0106973 A1 Jun. 12, 2003

(51) Int. Cl.[7] .................... F16L 41/00

(52) U.S. Cl. .................... 248/205.1; 248/56; 285/46

(58) Field of Search .................... 248/535, 205.1, 248/213, 541, 56, 74.1, 342; 285/205, 206, 46

(56) References Cited

U.S. PATENT DOCUMENTS

| | | | | | |
|---|---|---|---|---|---|
| 1,212,797 | A | * | 1/1917 | Mueller | 16/2.1 |
| 4,385,777 | A | * | 5/1983 | Logsdon | 16/2.1 |
| 4,516,749 | A | * | 5/1985 | Sullivan | 248/345 |
| 4,739,596 | A | * | 4/1988 | Cunningham et al. | 248/56 |
| 5,482,329 | A | * | 1/1996 | McCall et al. | 137/318 |
| 5,548,934 | A | * | 8/1996 | Israelson | 52/1 |
| 6,192,529 | B1 | * | 2/2001 | Jones et al. | 137/359 |
| 6,378,912 | B1 | * | 4/2002 | Condon et al. | 239/273 |

* cited by examiner

*Primary Examiner*—Leslie A. Braun
*Assistant Examiner*—A. Joseph Wujciak, III
(74) *Attorney, Agent, or Firm*—Gary K. Price, Esq.

(57) ABSTRACT

A shower arm support for supporting the shower arm that projects outwardly through a shower stall wall from the water supply system that extends such support to the water supply system behind the shower stall wall. The apparatus includes a base sleeve that inwardly slides over the shower arm so that the rear surface of the base sleeve abuts the exposed surface of the shower stall wall. The base sleeve is then affixed to the shower stall wall using screws threadably received within front threaded openings of the base sleeve, and then clamped to the shower arm using screws threadably received within side threaded openings of the base sleeve, so that the base sleeve supports the shower arm from being loose or wobbly, and extends such support to the water supply system behind the shower stall wall that is connected to the shower arm.

4 Claims, 3 Drawing Sheets

SHOWER ARM SUPPORT

CROSS REFERENCES TO RELATED APPLICATIONS

None

Statement as to rights to inventions made under Federally sponsored research and development: Not Applicable

BACKGROUND OF THE INVENTION

1. Field of the Invention

In a conventional shower stall installation, a decorative shower arm is connected to the water supply system behind the shower stall wall, and projects outwardly through the shower stall wall.

The present invention relates to an apparatus that slides over the shower arm so that the rear surface of the apparatus abuts the exposed surface of the shower stall wall. The apparatus is then attached to the exposed surface of the shower stall wall, and clamped to the exterior surface of the shower arm, so that the apparatus supports the shower arm from being loose or wobbly, and extends such support to the water supply system behind the shower stall wall.

2. Brief Description of Prior Art

It is conventional in shower installations for there to be a shower arm connected to the shower pipe of the water supply system behind the shower stall wall. The shower arm then connected to the shower pipe projects outwardly through the shower stall wall. The shower arm and the shower pipe of the water supply system often become loose and wobbly caused by the "on and off" water pressure which flows through the water supply system and shower arm. As a result, the threaded connections of the shower arm and the shower pipe will often weaken, and result in water leaks, often hidden leaks behind the shower stall wall.

Prior art methods for supporting the shower arm in efforts to avoid the shower arm from being loose, primarily involves anchoring the shower pipe of the water supply system to the wall framing behind the shower stall wall prior to installation of the shower stall, and then threadably connecting the shower arm to the mounted shower pipe of the water supply system. In the event the shower pipe of the water supply system behind the shower stall wall loosens or disconnects from the framing, or is not anchored during installation, the extending shower arm, as well as the water supply system behind the wall, becomes skewed, wobbly and/or loose thereby causing damages as previously described.

The property owner is then required to physically remove the shower stall in order to access the water supply system for repairs, or attempt to blindly repair the water supply system from an access opening normally in a closet or another room backing the shower stall wall. This repair process is both difficult and inconvenient.

The apparatus made in accordance with the present invention slides over the shower arm so that the rear surface of the apparatus abuts the exposed surface of the shower stall wall. The apparatus is then attached to the exposed surface of the shower stall wall, and clamped to the exterior surface of the shower arm, so that the apparatus supports the shower arm from being loose or wobbly, and extends such support to the water supply system behind the shower stall wall.

As will be seen from the subsequent descriptions, the preferred embodiment of the present invention overcomes shortcomings of prior art methods for supporting the shower arm and water supply system behind the shower stall wall.

SUMMARY OF THE INVENTION

The apparatus of the present invention supports the shower arm that projects outwardly through the shower stall wall from the water supply system, and extends such support to the water supply system behind the shower stall wall. The preferred embodiment includes a base sleeve that inwardly slides over the shower arm so that the rear surface of the base sleeve abuts the exposed surface of the shower stall wall. The base sleeve is then attached to the exposed surface of the shower stall wall, and clamped to the exterior surface of the shower arm, so that the base sleeve supports the shower arm from being loose or wobbly, and extends such support to the water supply system behind the shower stall wall that is connected to the shower arm.

DESCRIPTION OF THE PREFERRED EMBODIMENT

Figure 1:
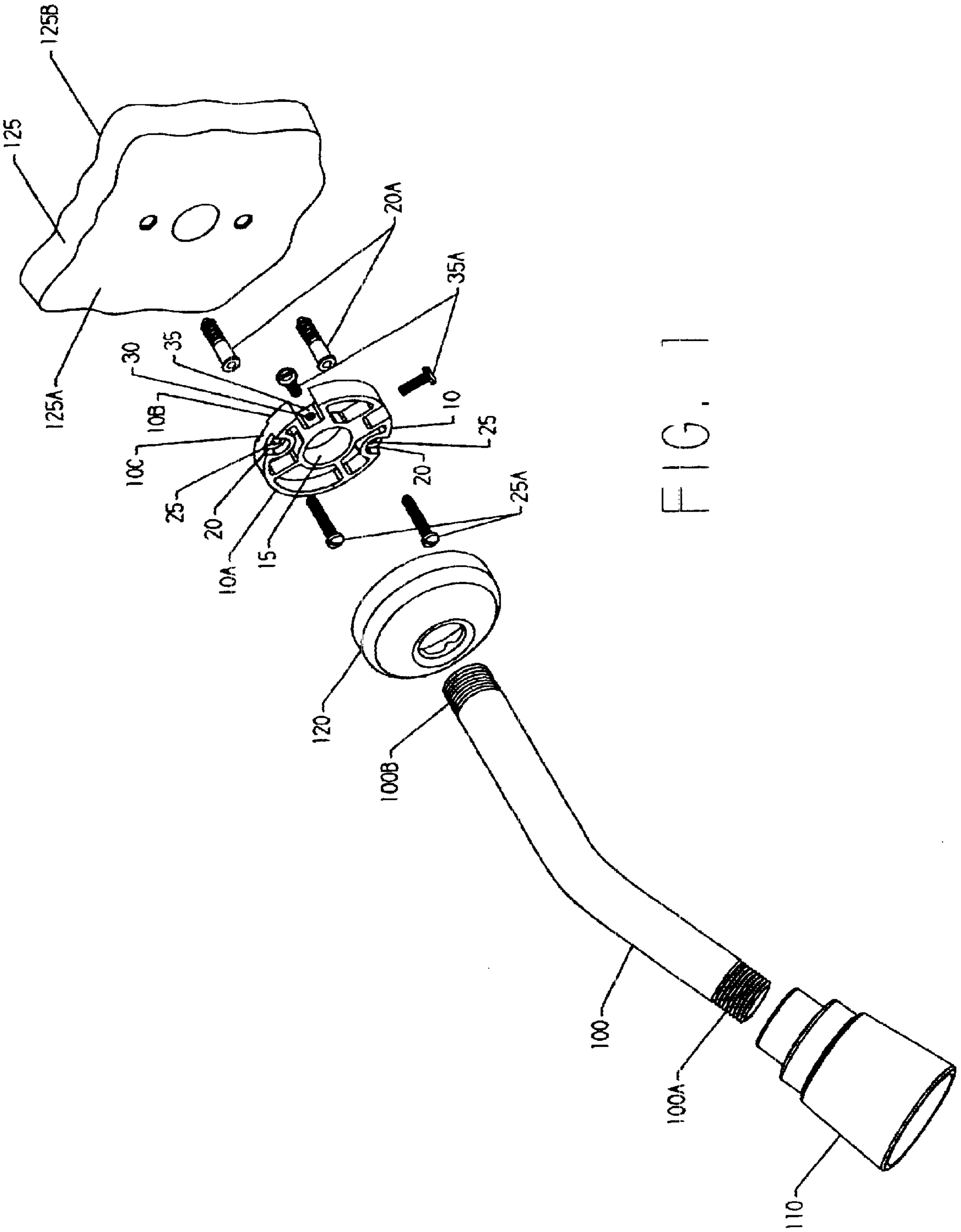
FIG. 1 is a perspective view of a shower arm assembly including the preferred embodiment of the present invention, namely, a shower arm support.
Figure 2:
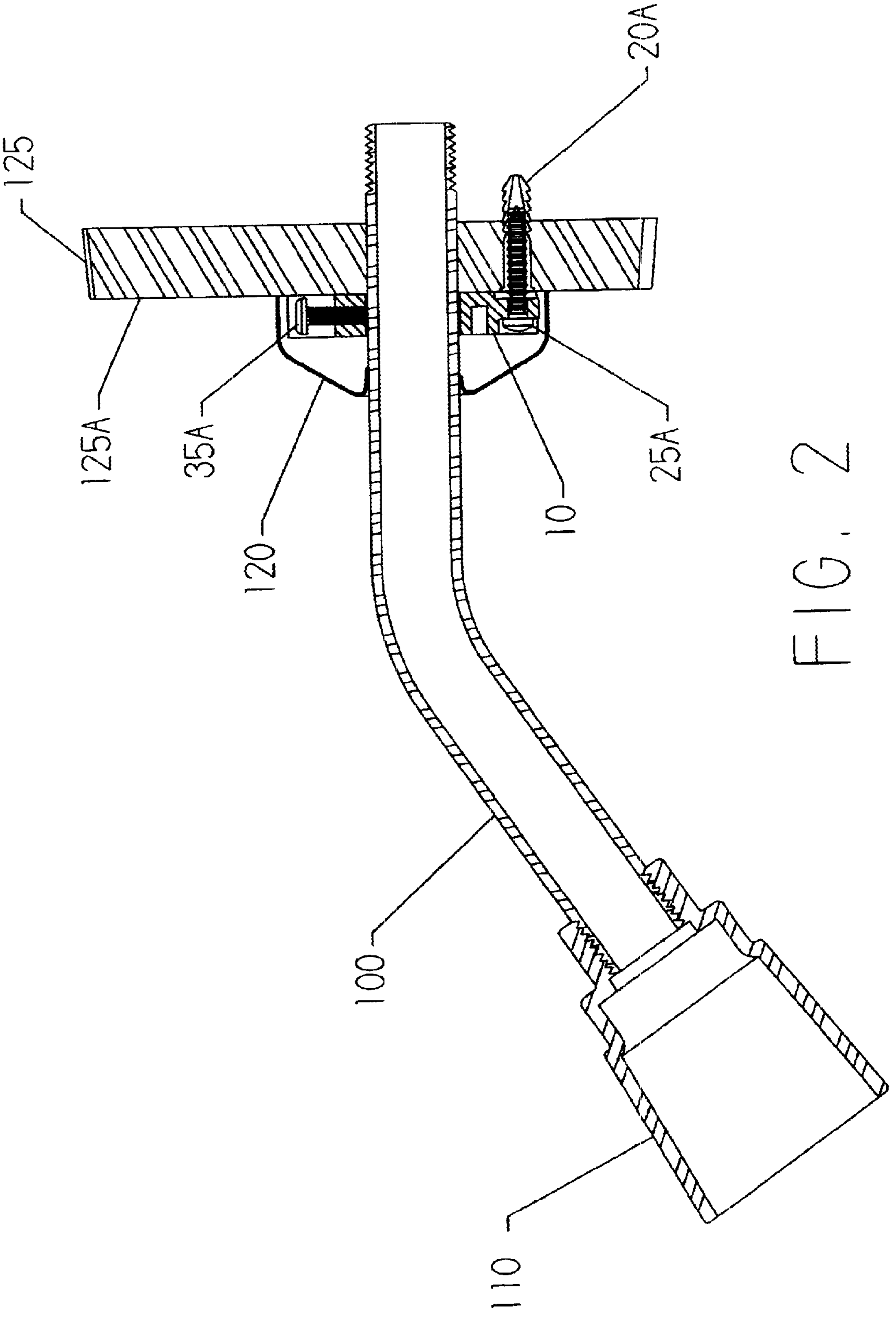
FIG. 2 illustrates a side view of the assembly of FIG. 1.
Figure 3:
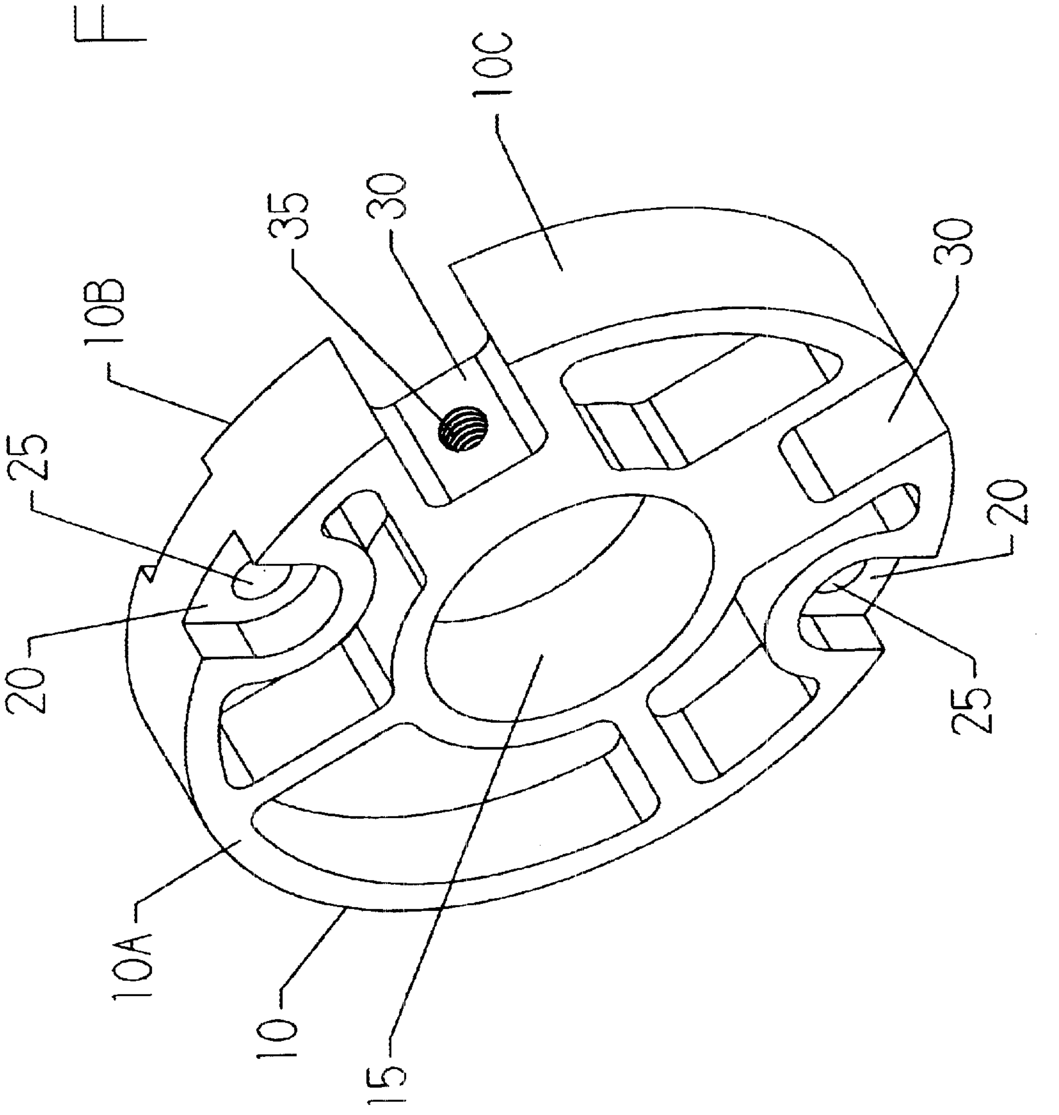
FIG. 3 illustrates a perspective view of the present invention, a shower arm support.

FIGS. 1–3 illustrate a preferred embodiment made in accordance with the present invention. As shown in FIGS. 1 and 3, the present invention includes a base sleeve 10 having a front surface 10A, a rear surface 10B, an outer edge surface 10C, and an opening 15 disposed in the midway of the base sleeve 10. The front surface 10A of the base sleeve 10 having at least one recessed portion 20. Each of the recessed portions 20 having a front threaded opening 25. The outer edge surface 10C of the base sleeve 10 having at least one grooved portion 30. Each of the grooved portions 30 having a side threaded opening 35 that projects inwardly from the grooved portion 30 to the opening 15. The base sleeve 10 has a generally cylindrical configuration.

As shown in FIG. 1, the components forming the conventional shower fixture includes a shower arm 100 having threaded ends 100A and 100B, said threaded end 100A for the mounting of a shower head 110, and said threaded end 100B for threadably mounting the shower arm 100 to a shower pipe that is apart of the water supply system (not shown) behind a shower stall wall 125.

As shown in FIG. 1, the shower stall wall 125 having an exposed surface 125A and a rear surface 125B. The conventional shower fixture further includes a cylindrical escutcheon 120 that abuts against the exposed surface 125A of a shower stall wall 125 when the shower installation is complete.

As shown in FIG. 2, the shower arm 100 projects outwardly through the shower stall wall 125. The opening 15 of the base sleeve 10 inwardly slides over the exterior surface of the shower arm 100. The diameter of the opening 15 approximates the outer diameter of the shower arm 100. This enables the base sleeve 10 to slide over the shower arm 100, but yet fit snug to the exterior surface of the shower arm 100. Further, the outer diameter of the base sleeve 10 is slightly less than the outer diameter of the escutcheon 120, so that when installation is complete, the base sleeve 10 is completely hidden by the escutcheon 120 when the escutcheon 120 abuts the exposed surface 125A of the shower stall wall 125.

The base sleeve 10 is slidably positioned over the shower arm 100 so that the rear surface 10B of the base sleeve 10 abuts the exposed surface 125A of the shower stall wall 125. The base sleeve 10 is then affixed to the shower stall wall 125 using screws 25A threadably received within each of the front threaded openings 25 of the base sleeve 10. The screws 25A extend through the front threaded opening 25 and into the exposed surface 125A of the shower wall 125, thereby attaching the base sleeve 10 to the shower stall wall 125. The base sleeve 10 is then clamped to the shower arm 100 using screws 35A threadably received within each of the side threaded openings 35 of the base sleeve 10. The screws 35A is inwardly received within the side threaded opening 35 until the screw 35A bites into the exterior surface of the shower arm 100, thereby securing the shower arm 100 within the opening 15 of the base sleeve 10.

In use, the first step in installation is to threadably connect the threaded end 100B of the shower arm 100 to the shower pipe of the water supply system behind the shower stall wall 125. Next, the base sleeve 10 is positioned onto the shower arm 100 by inserting the threaded end 100A of the shower arm 100 through the opening 15 of the base sleeve 10, and sliding the base sleeve 10 inwardly onto the shower arm 100 so that the rear surface 10B of the base sleeve 10 abutts the exposed surface 125A of the shower wall 125. The base sleeve 10 is then fixed into position using said screws 25A are threadably received within each of the front threaded openings 25 of the base sleeve 10. The screws 25A extend through the front threaded opening 25 and into an anchor 20A which can be located in the exposed surface 125A of the shower stall wall 125, thereby attaching the base sleeve 10 to the shower stall wall 125.

The base sleeve 10 is then clamped to the shower arm 100 using screws 35A is threadably received within each of the side threaded openings 35 of the base sleeve 10. The screws 35A is inwardly received within the side threaded opening 35, and is turned down until the screw 35A bites into the exterior surface of the shower arm 100, thereby securing the shower arm 100 within the opening 15 of the base sleeve 10.

The escutcheon 120 is then slid onto the shower arm 100 and moved inwardly onto the shower arm 100 until the escutcheon 120 abuts the exposed surface 125A of the shower stall wall 125. As shown in FIG. 2, when positioned, the base sleeve 10 is seated within the escutcheon 120 and is completely hidden by the decorative escutcheon 120. The shower head 110 is then threadably connected to the threaded end 100A of the shower arm 100. This completes the installation.

When installed, the rear surface 10B of the base sleeve 10 will abut the exposed surface 125A of the shower stall wall 125, and is securely attached to the wall 125 using said screws 25A. The shower arm 100 will be snug within the opening 15 of the base sleeve 10, and securely clamped therein using said screws 35A. As a result, the base sleeve 10 supports the shower arm 100 from being loose or wobbly, and extends such support to the water supply system connected to the shower arm 100.

Although the description above contains many specificities, these should not be construed as limiting the scope of the invention, but as merely providing illustrations of a presently preferred embodiment of this invention. Thus the scope of the invention should be determined by the appended claims in the formal application and their legal equivalents, rather than by the examples given.

We claim:

1. A shower arm support for use in supporting a shower arm that projects outwardly through an exposed surface of a shower stall wall, and said shower arm support extends to a shower pipe of a water supply system behind the shower stall wall, the shower arm support comprising:

a substantially cylindrical base sleeve including a front surface, a rear surface, an outer edge surface, and an opening disposed in the midway of the base sleeve; wherein the shower arm is slidably received within the opening of the base sleeve; wherein said outer edge surface of said base sleeve has at least one grooved portion, and the grooved portion having a side threaded opening for clamping the base sleeve to the shower arm, wherein said front surface of said base sleeve has at least one recessed portion, and the recessed portion having a front opening for mounting the base sleeve to the exposed surface of the shower stall wall.

2. The shower arm support as recited in claim 1, wherein the base sleeve is clamped to the shower arm by at least one side-screw inwardly directed through the side threaded opening.

3. A shower arm support for use in supporting a shower arm that projects outwardly through an exposed surface of a shower stall wall, and extends such support to a shower pipe of a water supply system behind the shower stall arm, the shower arm support comprising a substantially cylindrical base sleeve comprising an opening, said opening sized to slidably receive the shower arm, at least one front threaded opening for threadably mounting the base sleeve to the exterior surface of the shower stall wall, and at least one side threaded opening for threadably clamping the shower arm within the opening of the base sleeve.

4. The shower arm support as recited in claim 3, wherein the base sleeve is clamped to the shower arm by at least one screw inwardly directed through the side threaded opening.

* * * * *